(12) United States Patent  
Ichikawa et al.

(10) Patent No.: US 12,540,363 B2  
(45) Date of Patent: Feb. 3, 2026

(54) METHOD FOR DETECTING FLUCTUATION OF SOLIDIFIED LAYER AND METHOD FOR OPERATING BLAST FURNACE

(71) Applicant: JFE STEEL CORPORATION, Tokyo (JP)

(72) Inventors: Kazuhira Ichikawa, Tokyo (JP); Takeshi Sato, Tokyo (JP); Tetsuya Yamamoto, Tokyo (JP); Tomohiko Ito, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 514 days.

(21) Appl. No.: 17/919,668

(22) PCT Filed: Apr. 7, 2021

(86) PCT No.: PCT/JP2021/014778  
§ 371 (c)(1),  
(2) Date: Oct. 18, 2022

(87) PCT Pub. No.: WO2021/220751  
PCT Pub. Date: Nov. 4, 2021

(65) Prior Publication Data  
US 2023/0151448 A1 May 18, 2023

(30) Foreign Application Priority Data  
Apr. 30, 2020 (JP) ................. 2020-080085

(51) Int. Cl.  
*C21B 7/24* (2006.01)  
*C21B 5/00* (2006.01)  
*C21B 7/10* (2006.01)

(52) U.S. Cl.  
CPC .............. *C21B 7/24* (2013.01); *C21B 5/00* (2013.01); *C21B 7/106* (2013.01)

(58) Field of Classification Search  
CPC .. C21B 7/24; C21B 5/00; C21B 7/106; C21B 5/006; C21B 2300/04; C21B 5/02; F27D 2021/005; F27D 21/0028; F27B 1/28  
USPC ........................................ 266/99  
See application file for complete search history.

(56) References Cited

FOREIGN PATENT DOCUMENTS

| | | |
|---|---|---|
| CN | 1120354 A | 4/1996 |
| CN | 105005632 A | 10/2015 |
| CN | 108504804 A | 9/2018 |
| EP | 0688875 A1 | 12/1995 |
| JP | S57-032308 A | 2/1982 |

(Continued)

OTHER PUBLICATIONS

JPS60184607, Yoshikawa et al., Operating Method Of Blast Furnace, and Abstract, Sep. 20, 1985 (Year: 1985).*

(Continued)

*Primary Examiner* — Jessee R Roe  
*Assistant Examiner* — Michael Aboagye  
(74) *Attorney, Agent, or Firm* — Oliff PLC

(57) ABSTRACT

A method for detecting a fluctuation of a solidified layer, and a method for operating a blast furnace by employing the relevant method. In the method for detecting a fluctuation of a solidified layer, the fluctuation of the solidified layer in the lower part of a blast furnace is detected by using the amount of heat supplied to pig iron in the lower part of the blast furnace and the amount of heat in the pig iron tapped in a predetermined period.

4 Claims, 1 Drawing Sheet

(56) References Cited

FOREIGN PATENT DOCUMENTS

| | | | | |
|---|---|---|---|---|
| JP | S60184607 | * | 9/1985 | ............... C03B 5/42 |
| JP | H02-115311 A | | 4/1990 | |
| JP | H07-278627 A | | 10/1995 | |
| JP | 2557544 B2 | * | 11/1996 | ............... C21B 5/00 |
| JP | H09-67607 A | | 3/1997 | |
| JP | H10-273708 A | | 10/1998 | |
| JP | 2003-013118 A | | 1/2003 | |
| JP | 3769164 B2 | | 4/2006 | |
| JP | 2007-077440 A | | 3/2007 | |
| JP | 2016-6221 A | | 1/2016 | |
| KR | 2009-0059928 A | | 6/2009 | |
| RU | 2221874 C1 | | 1/2004 | |
| RU | 2223329 C1 | | 2/2004 | |
| RU | 2223330 C1 | | 2/2004 | |

OTHER PUBLICATIONS

JP2557544, OOishi et al., Control Method Of Pig Iron Solidified Layer Thickness at Blast Furnace Bottom, Nov. 27, 1996 (Year: 1996).*

Jul. 5, 2023 Extended European Search Report issued in European Patent Application No. 21795469.2.

Jun. 14, 2023 Office Action issued in Russian Patent Application No. 2022127929.

Nov. 3, 2021 Office Action issued in Taiwanese Patent Application No. 110113439.

May 16, 2024 Office Action issued in Chinese Patent Application No. 202180030929.7.

May 11, 2021 International Search Report issued in International Application No. PCT/JP2021/014778.

Fumiaki Yoshikawa et al. "Estimation of Refractory Wear and Solidified Layer Distribution in the Blast Furnace Hearth and Its Application to the Operation". Tetsu-to-Hagane, vol. 73, No. 15., 1987, pp. 2068-2075.

27, 2025 Office Action issued in Korean Application No. 10-2022-7037778.

Tang, Xin, et al. "Mathematical Model for Heat Transfer on Soliidifying Ladle of Hot Metal." Journal of Chongqing University (Natural Science), vol. 18, No. 4, pp. 104-109. Jul. 1995.

Jan. 19, 2024 Office Action issued in Chinese Patent Application No. 202180030929.7.

Oct. 29, 2025 Office Action issued in Korean Application No. 10-2022-7037778 No Translation provided, Document in Korean.

* cited by examiner

METHOD FOR DETECTING FLUCTUATION OF SOLIDIFIED LAYER AND METHOD FOR OPERATING BLAST FURNACE

TECHNICAL FIELD

This application relates to a solidified layer fluctuation detection method for detecting a fluctuation of a solidified layer in the lower part of a blast furnace and a method for operating a blast furnace by employing the fluctuation detection method.

BACKGROUND

To extend the life of a blast furnace and stabilize its operation, it is important to quantitatively detect a solidified layer on the lower part of the blast furnace. For example, Non-Patent Literature 1 discloses that one factor that determines the life of a blast furnace is the wear of the bottom bricks of the blast furnace. The bottom bricks of the blast furnace are worn by contact with pig iron. The presence of a solidified layer on surfaces of the bottom bricks of the furnace suppresses this wear; thus, the solidified layer having an appropriate thickness is preferable to be present on the surfaces of the bottom bricks of the furnace.

On the other hand, excessive growth of the solidified layer decreases the capacity of the lower part of the blast furnace for storing molten pig iron. A decrease in capacity for storing pig iron can easily cause the melt to accumulate to the height of tuyeres of the blast furnace when the tapping of the melt from the blast furnace is blocked by some factor. If the melt comes into contact with the tuyeres, erosion will occur at the tuyeres. When erosion damage occurs at the tuyeres, the blast furnace operation is interrupted to repair the tuyeres. Thus, the blast furnace operation cannot be continued stably.

When a large solidified layer is formed in the lower part of the blast furnace, an operation is conducted to dissolve this solidified layer, and it is necessary to ascertain whether the dissolution of the solidified layer in the furnace proceeds properly during the operation. For this purpose, it is important to detect the fluctuation of the solidified layer present in the blast furnace. Non-Patent Literature 1 discloses a method for estimating the thickness of the solidified layer present in the blast furnace by means of heat transfer calculation from the temperature measured with thermometers arranged around the bottom bricks of the blast furnace. Patent Literature 1 discloses an image analysis method for the amount of pig iron-slag mixture tapped from a blast furnace for the purpose of detecting the amount of pig iron-slag mixture tapped from the blast furnace.

CITATION LIST

Patent Literature

PTL 1: Japanese Unexamined Patent Application Publication No. 2016-6221
PTL 2: Japanese Unexamined Patent Application Publication No. 2-115311

Non-Patent Literature

NPL 1: Yoshikawa Fumiaki and five others, "Estimation of refractory wear and solidified layer distribution in the blast furnace hearth and its application to the operation", Tetsu-to-Hagané, vol. 73(1987), No. 15, P2068-P2075

SUMMARY

Technical Problem

In the method disclosed in Non-Patent Literature 1, the heat transfer calculation is based on the assumption of steady-state heat transfer in the solidified layer and the bottom bricks of the blast furnace with the thermometers arranged at the bottom bricks of the furnace. For this reason, the thickness of the solidified layer cannot be estimated until a fluctuation in the thickness of the solidified layer is completed and heat transfer reaches a steady state. Thus, the method disclosed in Non-Patent Literature 1 has a problem that the fluctuation of the solidified layer cannot be detected at an early stage. Although the amount of pig iron and slag tapped can be estimated by the method disclosed in Patent Literature 1, it is difficult to detect the fluctuation of the solidified layer because it cannot separate newly generated pig iron in the blast furnace from that generated by the melting of a solidified material. The disclosed embodiments been made in light of the foregoing problems of the related art and aims to provide a method for detecting a fluctuation of a solidified layer, the method enabling early detection of the fluctuation of the solidified layer, and a method for operating a blast furnace by employing the relevant method.

Solution to Problem

Means for Solving the Above Problems are Described Below

[1] A method for detecting the fluctuation of a solidified layer includes detecting the fluctuation of a solidified layer in the lower part of a blast furnace using the amount of heat supplied to pig iron in the lower part of the blast furnace and the amount of heat in the pig iron tapped in a predetermined period.

[2] In the method for detecting the fluctuation of a solidified layer described in [1], the solidified layer is determined to have grown when expression (1) below is satisfied, and the solidified layer is determined to have decreased when expression (2) is satisfied, $$a \times T_Q > a \times T_{pig} + b \quad (1)$$

$$a \times T_Q < a \times T_{pig} + b \quad (2)$$

where in expressions (1) and (2) above, a is a ratio in which heat supplied to the lower part of the blast furnace in a steady state where the solidified layer does not increase or decrease is transferred to the pig iron, $T_Q$ is a furnace heat index (MJ/t-pig) that is an index of the amount of heat supplied to the lower part of the blast furnace, $T_{pig}$ is a temperature (° C.) of the pig iron tapped, and a and b are each a constant determined by a component concentration of the pig iron tapped.

[3] In the method for detecting the fluctuation of a solidified layer described in [1] or [2], the predetermined period is a period from the end of previous tapping of pig iron to the end of current tapping of pig iron.

[4] A method for operating a blast furnace includes detecting the fluctuation of a solidified layer in the lower part of a blast furnace by employing the method for detecting the fluctuation of a solidified layer described in any one of [1] to [3], and promoting melting of the solidified layer when the solidified layer has grown, and promoting growth of the solidified layer when the solidified layer has decreased.

Advantageous Effects of Invention

The implementation of the method for detecting the fluctuation of the solidified layer according to the disclosed embodiments enables early detection of the increase or decrease of the solidified layer. When the solidified layer in the lower part of the blast furnace is determined to have grown by the fluctuation detection method, the melting of the solidified layer is promoted, and when the solidified layer has decreased, the growth of the solidified layer is promoted. This suppresses the fluctuation of the solidified layer in the lower part of the blast furnace and achieves a stable blast furnace operation.

DETAILED DESCRIPTION

Figure 1:
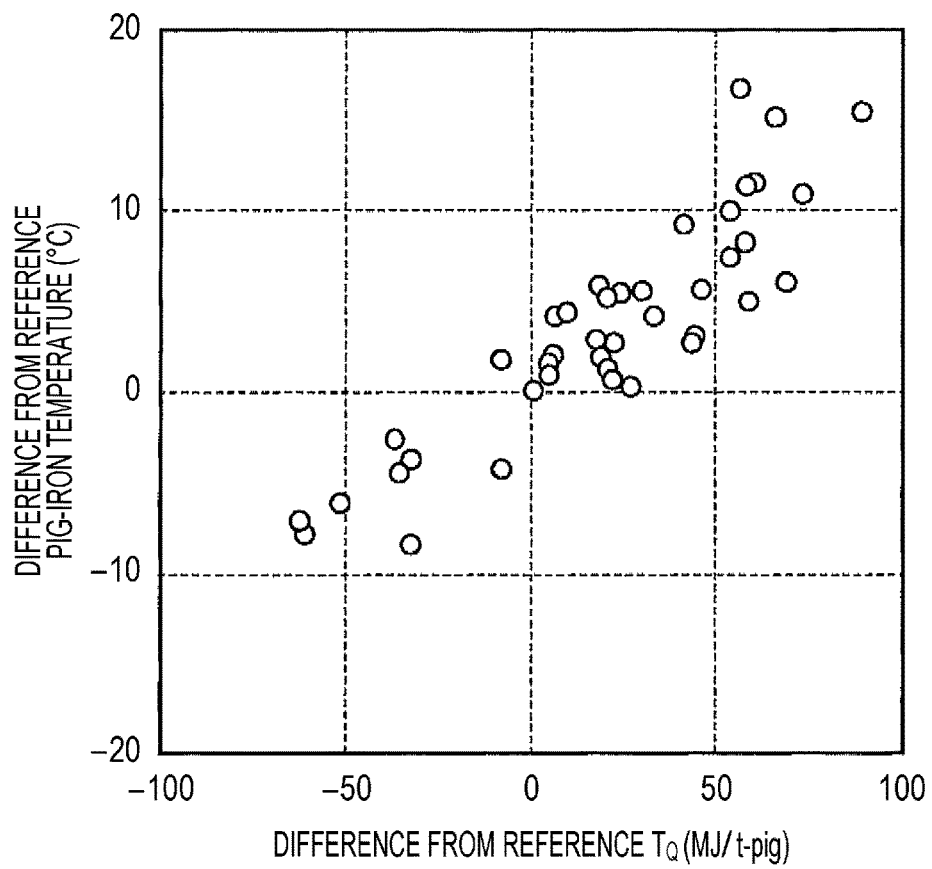
FIG. 1 illustrates the relationship between the pig-iron temperature and the furnace heat index $T_Q$ during steady-state operation.

Disclosed embodiments will be described below. Pig iron produced in a blast furnace is mainly heated by heat generated by sensible heat of a hot blast and combustion of a carbonaceous material in the lower part of the blast furnace. Endothermic reactions, such as a solution loss reaction and a reduction reaction of moisture contained in the hot blast at tuyere tips, also occur in the lower part of the blast furnace. Heat loss also occurs due to heat transfer to the stave in the lower part of the furnace as the heat transfer to the furnace wall. These amounts of heat do not contribute to the heating of the pig iron. Thus, there is considered to be a certain relationship between the heat balance and the pig-iron temperature in the lower part of the blast furnace in the steady state where the solidified layer does not vary.

One of the indices of the amount of heat supplied to the lower part of the blast furnace is a furnace heat index $T_Q$ (MJ/t-pig) disclosed in Patent Literature 2. $T_Q$ is expressed by expression (3).

$$T_Q = Q_1 + Q_2 - (Q_3 + Q_4 + Q_5 + Q_6) \quad (3)$$

In expression (3) above, $Q_1$ is the heat of combustion (MJ/t-pig) of coke at the tuyere tips. $Q_1$ can be calculated by dividing the amount of heat generated by coke combustion, which is calculated from the amount of oxygen blown into the blast furnace through the tuyeres per unit time, by the amount of pig iron produced in that unit time.

$Q_2$ is the blast sensible heat (MJ/t-pig) input into the blast furnace by the blast from the tuyeres. $Q_2$ can be calculated by finding the amount of heat input into the blast furnace by the blast per unit time from the measured blast flow rate and blast temperature per unit time, and dividing this value by the amount of pig iron produced in the unit time.

$Q_3$ is heat of the solution loss reaction (MJ/t-pig). The amount of carbon consumed by the furnace reaction in the unit time can be calculated from the difference between the amount of carbon burnt by the blast per unit time and the amount of carbon emitted, the amount of carbon emitted being determined from the analytical value of CO and $CO_2$ gas concentrations in the upper part of the blast furnace. The heat of the solution loss reaction can be calculated from the amount of carbon consumed. $Q_3$ can be calculated by dividing this heat of reaction by the amount of pig iron produced in the unit time.

$Q_4$ is the heat of decomposition of moisture (MJ/t-pig), the moisture being mainly contained in the blast. $Q_4$ can be calculated by dividing the heat of decomposition per unit time, obtained from the measured value of moisture in the blast, by the amount of pig iron produced in the unit time.

$Q_5$ is the amount of transition of heat flux (MJ/t-pig) through cooling water. $Q_5$ can be calculated by calculating the amount of heat transfer per unit time to the cooling water based on the amount of cooling water and the temperature difference of the cooling water between the inlet and outlet sides of the blast furnace body, and dividing the amount of heat transfer by the amount of pig iron produced in the unit time. $Q_6$ is the heat of decomposition of the reducing material injected from the tuyeres in unit time. $Q_6$ can be calculated by dividing the relevant heat of decomposition by the amount of pig iron produced in the unit of time.

Instead of $T_Q$ calculated by expression (3), the amount of heat described below may be used as an index of the amount of heat supplied to the lower part of the blast furnace: Sensible heat carried by a gas moving from the lower part to the upper part of the blast furnace is subtracted from $T_Q$. Sensible heat brought by coke and ore materials supplied from the upper part to the lower part of the blast furnace is added thereto. The resulting amount of heat is proportionally divided into pig iron and molten slag. The amount of heat supplied to the pig iron calculated by this method may be used. The sensible heat carried by the gas can be calculated by multiplying the temperature difference between the estimated temperature of the gas burnt in front of the tuyeres and the reference temperature representing the upper end of the lower part of the blast furnace by the specific heat of the gas in the blast furnace. The sensible heat of the raw material supplied to the lower part of the blast furnace can be calculated by multiplying the temperature difference between a temperature of 1,450° C. to 1,500° C., which is estimated to be a temperature at the lower end of the cohesive zone, and the above reference temperature by the specific heat of the raw material. The value obtained by these processes is distributed to the melt present in the lower part of the blast furnace; thus, a value obtained by multiplying the relevant value by the ratio of the specific heat of the pig iron out of the sum considering the mass ratio of the specific heats of the pig iron and slag can be regarded as the amount of heat supplied to the pig iron. The reference temperature described above is in the range of 800° C. to 1,200° C., preferably 900° C. to 1,000° C.

FIG. 1 illustrates the relationship between the pig-iron temperature and the furnace heat index $T_Q$ during the steady state. The horizontal axis in FIG. 1 is the furnace heat index $T_Q$ (difference from reference $T_Q$) (MJ/t-pig), and the vertical axis is the pig-iron temperature (difference from the reference pig-iron temperature) (° C.). The steady state is a state of blast furnace operation when the difference in mass between the calculated amount of pig iron and slag calculated from the amount of raw materials charged into the blast furnace per day and the actual amount of pig iron and slag tapped from the blast furnace on that day is within 5 mass %. Hereinafter, a blast furnace operation in a steady state may be referred to as a steady-state operation. The pig-iron temperature in the following description is an average value of the pig-iron temperatures on that day. In FIG. 1, however, an intermediate value of the pig-iron temperature is defined as a reference pig-iron temperature (1,500° C., in the example illustrated in FIG. 1), and the pig-iron temperature is indicated as a difference from the reference pig-iron temperature.

As illustrated in FIG. 1, in the steady state, there is a correlation between the furnace heat index $T_Q$ and the pig-iron temperature. Accordingly, when α is defined as a ratio at which heat supplied to the lower part of the blast furnace in the steady state is transferred to the pig iron, the relationship of expression (4) below is established.

$$\alpha \times T_Q \times W_{prod} = Q_{pig} \times W_{drain} \quad (4)$$

In expression (4), $W_{prod}$ (t-pig) is the amount (t) of pig iron produced in the blast furnace in the time t from the end of the previous tapping to the end of the current tapping, and $W_{drain}$ is the amount (t) of pig iron currently tapped from the blast furnace. $Q_{pig}$ (MJ/t-pig) is the amount of heat of the pig iron at the pig-iron temperature $T_{pig}$ (° C.) and can be calculated by expression (5) below.

$$Q_{pig} = a \times T_{pig} + b \quad (5)$$

In expression (5) above, a and b are each a constant determined by the component concentration of tapped pig iron. The values of the constants "a" and "b" corresponding to pig irons having various component concentrations are obtained in advance. For example, in the case of pig iron having a carbon concentration of 4 to 5 mass %, a=0.84, and b=84.

Letting the amount of pig iron melted or solidified in the blast furnace in the time t be $W_x$ ($t_{pig}$), $W_{drain}$ can be calculated by expression (6) below.

$$W_{drain} = W_{prod} W_x \quad (6)$$

In expression (6) above, $W_x$ is the amount of solidified material (t-pig). When the solidified material is dissolved, $W_x$ is a positive value. When the solidified material is solidified, $W_x$ is a negative value. When expressions (5) and (6) are substituted into expression (4), expression (4) is represented by expression (7) below.

$$\alpha \times T_Q \times W_{prod} = (a \times T_{pig} + b) \times (W_{prod} + W_x) \quad (7)$$

Modification of expression (7) above leads to expression (8) below.

$$W_x / W_{prod} = [\alpha \times T_Q / (a \times T_{pig} + b)] - 1 \quad (8)$$

During the steady-state operation, heat supplied to the lower part of the furnace is transferred to pig iron at a constant ratio α, the relationship of expression (9) is established.

$$\alpha \times T_Q = Q_{pig} = a \times T_{pig} + b \quad (9)$$

When the relationship of expression (9) is substituted into expression (8) above, the expression can be expanded as presented in expression (10). That is, $W_x = 0$ during the steady-state operation.

$$W_x / W_{prod} = [\alpha \times T_Q / (a \times T_{pig} + b)] - 1 = 1 - 1 = 0 \quad (10)$$

Under this assumption, there is no increase or decrease in the solidified layer during the steady-state operation. Thus, the pig-iron temperature and the $T_Q$ value when the actual amount of pig iron produced roughly matches the amount of pig iron expected from the amount of raw materials charged are substituted into expression (9), so that it is possible to obtain the a value, which is the ratio at which heat supplied to the lower part of the blast furnace is transferred to the pig iron in the steady state.

When the solidified layer has decreased by melting, the right side of expression (8) is positive, and expression (8) is represented by expression (1) below.

$$\alpha \times T_Q > a \times T_{pig} + b \quad (1)$$

Expression (1) indicates that when the solidified layer is melted and decreased, pig iron having a low temperature is tapped, compared with the case of the steady-state operation, with respect to the amount of heat supplied to the lower part of the blast furnace. In the method for detecting the fluctuation of a solidified layer according to the present embodiment, this relationship is used to determine that when the amount of heat ($\alpha \times T_Q$) supplied to pig iron in the lower part of the blast furnace is larger than the amount of heat ($a \times T_{pig} + b$) of the pig iron tapped, the amount of heat corresponding to the difference therebetween is used for melting the solidified layer, and the solidified layer in the lower part of the blast furnace is decreased.

On the other hand, when the solidified layer has grown, expression (8) is negative. Thus, expression (8) is represented by expression (2) below.

$$\alpha \times T_Q < a \times T_{pig} + b \quad (2)$$

Expression (2) indicates that when the solidified layer grows, pig iron having a high amount of heat is tapped, compared with the case of the steady-state operation, with respect to the amount of heat supplied to the lower part of the blast furnace. In the method for detecting the fluctuation of a solidified layer according to the present embodiment, this relationship is used to determine that when the amount of heat ($\alpha \times T_Q$) supplied to pig iron in the lower part of the blast furnace has been smaller than the amount of heat ($a \times T_{pig} + b$) of the pig iron tapped, the amount of heat corresponding to the difference therebetween has been used for solidifying the solidified layer, and the solidified layer in the lower part of the blast furnace has grown.

As described above, in the method for detecting the fluctuation of a solidified layer according to the present embodiment, the fluctuation of the solidified layer in the lower part of the blast furnace is detected using the amount of heat ($\alpha \times T_Q$) supplied to pig iron in the lower part of the blast furnace and the amount of heat ($a \times T_{pig} + b$) of the pig iron tapped in a predetermined period. Specifically, the amount of heat ($\alpha \times T_Q$) supplied to pig iron in the lower part of the blast furnace and the amount of heat ($a \times T_{pig} + b$) of the pig iron tapped are calculated. When ($\alpha \times T_Q$) and ($a \times T_{pig} + b$) satisfy expression (1), the solidified layer is determined to have decreased in the predetermined period. When ($\alpha \times T_Q$) and ($a \times T_{pig} + b$) satisfy expression (2), the solidified layer is determined to have grown in the predetermined period. This enables early detection of the fluctuation of the solidified layer during the blast furnace operation and allows the blast furnace operation to maintain the solidified layer in the lower part of the blast furnace in an appropriate state.

The predetermined period for calculating ($\alpha \times T_Q$) and ($a \times T_{pig} + b$) is preferably a period from the end of the previous tapping of pig iron to the end of the current tapping of pig iron. Each time pig iron is tapped, the temperature and composition values of the pig iron are measured. Thus, $T_{pig}$ (° C.) can be determined using these values. The constants a and b can be determined using the component values. The predetermined period is not limited to the period from the end of the previous tapping of pig iron to the end of the current tapping of pig iron as long as "$\alpha \times T_Q$" and "$a \times T_{pig} + b$" in the period can be determined. For example, the $T_{pig}$ values of pig irons tapped in a given period from the end of any given tapping of pig iron to the end of any given tapping of pig iron are weighted-averaged on the basis of the amounts of pig irons tapped. The $T_Q$ values in the period are weighted-averaged in the same manner. The resulting values may be used as values in the given period.

When the solidified layer is determined to have grown by the method for detecting the fluctuation of a solidified layer, a blast furnace operation method is implemented to promote the melting of the solidified layer by increasing the target amount of heat input and increasing the amount of heat supplied to the lower part of the blast furnace. The operation to increase the amount of heat supplied to the lower part of the blast furnace may be performed by increasing the heat of combustion of coke per ton of pig iron as given in $Q_1$ above or by increasing the blast sensible heat per ton of pig iron as given in $Q_2$ above.

When the solidified layer is determined to have decreased by the method for detecting the fluctuation of a solidified layer, a blast furnace operation method is implemented to promote the growth of the solidified layer by decreasing the target amount of heat input and decreasing the amount of heat supplied to the lower part of the blast furnace or increasing the amount of heat transfer from the lower part of the blast furnace. The operation to decrease the amount of heat supplied to the lower part of the blast furnace may be performed by increasing the heat loss given in $Q_5$. This suppresses the fluctuation of the solidified layer in the lower part of the blast furnace and achieves a stable blast furnace operation.

EXAMPLES

Figure 2:
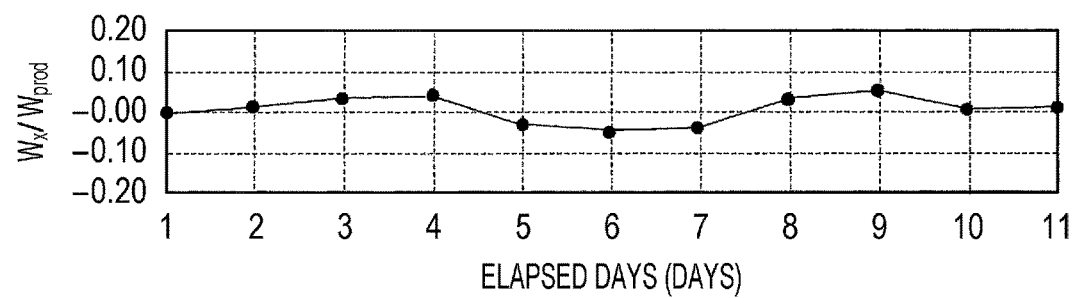
FIG. 2 illustrates a fluctuation in $W_x/W_{prod}$ versus the elapsed days.

An example in which a fluctuation in $W_x/W_{prod}$ and a fluctuation in furnace bottom temperature were examined in a blast furnace operation using a blast furnace having an inner capacity of 5,000 m$^3$ will be described below. FIG. 2 illustrates a fluctuation in $W_x/W_{prod}$ with respect to the elapsed days. In FIG. 2, the horizontal axis is the elapsed days (days), and the vertical axis is $W_x/W_{prod}$.

As illustrated in FIG. 2, $W_x/W_{prod}$ decreased on day 5. The decrease in $W_x/W_{prod}$ indicates that $W_x/W_{prod}$ has been negative and thus expression (2) above is satisfied. Accordingly, it is possible to detect the fact that the solidified layer in the lower part of the blast furnace has grown on day 5.

$W_x/W_{prod}$ increased on day 8. The increase in $W_x/W_{prod}$ indicates that $W_x/W_{prod}$ has been positive and thus expression (1) above is satisfied. Accordingly, it is possible to detect the fact that the solidified layer in the lower part of the blast furnace has decreased on day 8.

Figure 3:
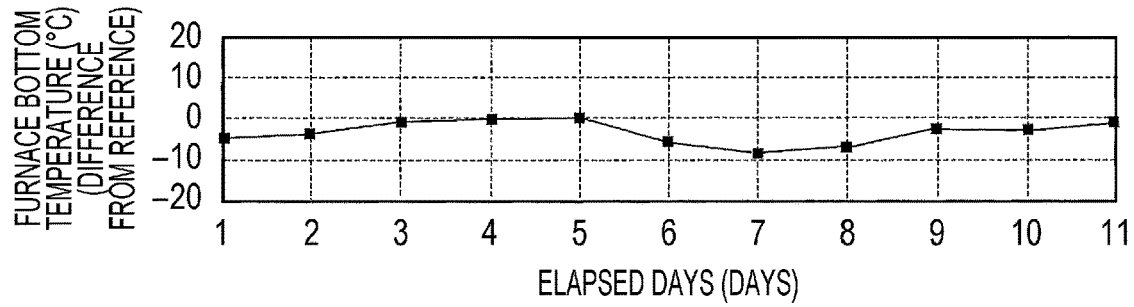
FIG. 3 illustrates the fluctuation of furnace bottom temperature versus the elapsed days.

FIG. 3 illustrates the fluctuation of the furnace bottom temperature versus the elapsed days in the same blast furnace operation. In FIG. 3, the horizontal axis is the elapsed days (days), and the vertical axis is the furnace bottom temperature (° C.). The furnace bottom temperature is the value of a thermometer installed in the middle portion of the hearth of the blast furnace bottom.

As illustrated in FIG. 3, the furnace bottom temperature decreased on day 6. This decrease in furnace bottom temperature is thought to be due to the growth of the solidified layer at the furnace bottom, thereby decreasing the amount of heat transferred from the inside of the furnace to the furnace bottom. That is, it is understood that the detection of the fluctuation of the solidified layer using the furnace bottom temperature is later than the detection using the amount of heat supplied to the lower part of the blast furnace and the temperature of pig iron tapped. From these results, it was confirmed that the implementation of the method for detecting the fluctuation of a solidified layer can detect the increase or decrease of the solidified layer in the lower part of the blast furnace at an early stage. When the solidified layer in the lower part of the blast furnace is determined to have grown on the basis of the detection, an operation for promoting the melting of the solidified layer is performed, and when the solidified layer in the lower part of the blast furnace is determined to have decreased, a blast furnace operation for promoting the growth of the solidified layer is performed. It can be seen that this suppresses the fluctuation of the solidified layer in the lower part of the blast furnace and achieves a stable blast furnace operation.

The invention claimed is:

1. A method for detecting a fluctuation of a solidified layer, the method comprising: detecting a fluctuation of a solidified layer in a lower part of a blast furnace using an amount of heat supplied to pig iron in the lower part of the blast furnace represented by $T_Q$ and an amount of heat in the pig iron tapped in a predetermined period represented by $T_{pig}$; wherein: $T_Q$ is a furnace heat index (MJ/t-pig) that is an index of an amount of heat supplied to the lower part of the blast furnace, and $T_{pig}$ is a temperature (° C.) of the pig iron tapped; determining that the solidified layer has decreased when expression (1) below is satisfied:

$$a \times T_Q > a \times T_{pig} + b \quad (1); \text{and}$$

determining that the solidified layer has grown when expression (2) is satisfied:

$$a \times T_Q < a \times T_{pig} + b \quad (2),$$

where in the expressions (1) and (2) above: a is a ratio of (an amount of heat (MJ/t-pig) of the pig iron at pig-iron temperature $T_{pig}$ multiplied by an amount of pig iron tapped from the blast furnace)/(To multiplied by an amount of pig iron produced in the predetermined time period) in which heat supplied to the lower part of the blast furnace in a steady state where the solidified layer does not increase or decrease is transferred to the pig iron, a and b are each a constant determined by a component concentration of the pig iron tapped.

2. The method for detecting a fluctuation of a solidified layer according to claim 1, wherein the predetermined period is a period from an end of a previous tapping of pig iron to an end of a current tapping of pig iron.

3. A method for operating a blast furnace, the method comprising:
    detecting a fluctuation of a solidified layer in a lower part of a blast furnace by employing the method for detecting a fluctuation of a solidified layer according to claim 1; and
    promoting melting of the solidified layer when the solidified layer has grown, and promoting growth of the solidified layer when the solidified layer has decreased.

4. A method for operating a blast furnace, the method comprising:
    detecting a fluctuation of a solidified layer in a lower part of a blast furnace by employing the method for detecting a fluctuation of a solidified layer according to claim 2; and
    promoting melting of the solidified layer when the solidified layer has grown, and promoting growth of the solidified layer when the solidified layer has decreased.

* * * * *